United States Patent Office 2,990,248
Patented June 27, 1961

2,990,248
METHOD FOR RECOVERING SELENIUM AND TELLURIUM VALUES
Luther E. Vaaler, Columbus, Ohio, assignor, by mesne assignments, to Diamond Alkali Company, Cleveland, Ohio, a corporation of Delaware
No Drawing. Filed Apr. 9, 1956, Ser. No. 576,774
5 Claims. (Cl. 23—139)

This invention relates to new and improved process for separating tellurium from selenium and more particularly relates to a process for separating tellurium and selenium in the treatment of copper refinery anode slimes and/or other selenium-tellurium containing source materials.

This application is a continuation-in-part of my co-pending application Ser. No. 527,287, filed August 9, 1955, now Patent No. 2,835,558.

One of the primary commercial sources of selenium has been anode slimes produced in the electrolytic refining of copper. Copper refinery anode slimes originate during the electrolytic purification of relatively impure copper obtained by pyrometallurgical methods. In such a purification process, the impure copper is made the anode in an electrolytic cell. The impurities associated with the anode, including selenium and tellurium, sink to the bottom of the cell and are collected there as slimes.

While these slimes vary somewhat in composition, a typical analysis is the following wherein the quantities are expressed in terms of percent by weight:

| | | | |
|---|---|---|---|
| Selenium | 6.83 | Tin | 9.0 |
| Tellurium | 1.29 | Bismuth | 0.3 |
| Gold | 0.5 | Nickel | 0.8 |
| Silicon | 0.9 | Aluminum | 1.3 |
| Antimony | 1.0 | Copper | 11.0 |
| Iron | 0.15 | Silver | 23.0 |
| Arsenic | 0.5 | Zinc | 0.4 |
| Magnesium | 0.006 | Titanium | 0.006 |
| Lead | 28.0 | Calcium | 0.007 |

The prior art techniques of recovering selenium from such slimes typically involve a sulfate roasting of the slimes, followed in some instances by a caustic leach with subsequent use of HCl and sulfur dioxide to precipitate selenium metal. Roasting of the slimes, as usually carried out heretofore as an essential step, of course, involves certain difficulties in equipment maintenance and necessarily increases the cost of operation. Further, prior methods of selenium separation and recovery have not yielded a completely satisfactory solution to the problem of providing an adequate supply of this important element.

One of the significant problems heretofore associated with the recovery of selenium, has been that in many instances tellurium has been only difficultly removable, if at all, from the selenium in the normal course of selenium recovery. Hence, while it will be appreciated that various commercial processes have been proposed and used for the recovery of selenium, these prior techniques generally are rather complicated insofar as the separation of selenium from tellurium is concerned.

Roasting of copper refinery anode slimes with sulfuric acid volatilizes the selenium in the form of selenium dioxide but extraction by this method generally is not complete. The residue from such a roasting typically is leached with water to recover the copper and with caustic solution to recover the tellurium. However, by such practice, the copper leach solution is contaminated with both selenium and tellurium and the tellurium leach solution contains selenium. Further, the residue itself after roasting and leaching operations still contains appreciable amounts of both selenium and tellurium.

Selenium also may be recovered from anode slimes by smelting or roasting with soda, followed by leaching the residue with water. However, this technique does not lead to a desirable high recovery and also fails to separate tellurium from the selenium.

In prior practice, a typical method of separating selenium and tellurium occurring in the same leach liquor begins with an alkaline solution containing both selenite and tellurite ions. Such a solution is neutralized to a pH of about 6.0 to 6.2 whereby the tellurite hydrolyzes to insoluble tellurium dioxide, while soluble selenious acid remains in the solution. However, tellurium is not completely separated from the solution by this method and the precipitate obtained contains selenium in addition to tellurium. Thus, it will be appreciated that even this prior method requires further product purification in order to obtain an adequate separation of tellurium and selenium.

It is, therefore, the principal object of the present invention to avoid the difficulties heretofore encountered in the recovery of selenium and in the separation of tellurium therefrom.

A further object of the invention is the provision of a new and improved method for separating tellurium and selenium.

A still further object of the invention is the provision of a new and improved process for recovering selenium from copper refinery anode slimes and separating tellurium therefrom.

These and other objects and advantages of the invention will appear more fully in the following description thereof.

This invention is an improvement upon the invention described and claimed in my co-pending application Serial No. 527,287 filed August 9, 1955. While the process described in that application does indeed constitute a singular improvement insofar as the recovery of substantially pure selenium from various sources of material is concerned, the further discovery has now been made that certain of the process steps employed in the practice of the prior invention lead to the obtention of a direct, simple, and substantially complete separation of selenium and tellurium.

The present invention broadly comprises a method of separating tellurium from selenium which comprises subjecting a source material containing both tellurium and selenium to an oxidizing leach in an aqueous solution of an alkali metal hydroxide and thereafter removing from the thus-obtained product a solid residue containing substantially all the tellurium originally present in said material. In a preferred embodiment, the alkali metal hydroxide is sodium hydroxide although the expression "alkali metal hydroxide" as used throughout the specification and claims is intended in a generic sense to include hydroxides of the various alkali metals including sodium, potassium, lithium, rubidium and cesium, sodium hydroxide being preferred for various reasons largely because of its relatively low cost and ready availability.

In carrying out the oxidizing leach, superior results are obtained when leaching is conducted at an elevated temperature of at least about 150° C. The maximum temperature which advantageously can be employed is dictated somewhat by the attack of alkali metal hydroxides on various metals at high temperatures. However, a typically practicable upper limit using an autoclave, or other pressure type reactor formed of such alkali metal hydroxide resistant materials as nickel, is about 400° C. A preferred temperature range is about 200 to 250° C., especially using sodium hydroxide.

The concentration of the alkali metal hydroxide generally should range between about 5 and 50% by weight, i.e., an aqueous solution of alkali metal hydroxide should contain between about 5 and 50% by weight of alkali metal hydroxide. A preferred composition of the leach liquor employs an alkali metal hydroxide, especially sodium hydroxide, in an amount within the range from about 10–40% by weight.

While the time required to complete the oxidizing leach will vary somewhat depending on the nature of the source material, the concentration of tellurium and selenium, the equipment employed, and the like, it has been found desirable to conduct the leaching for at least about 5 hours, a time within the range from about 10–24 hours being preferable, although more extended leaching treatments up to 72 hours are also contemplated.

The leach is to be conducted in an oxidizing atmosphere, superior results generally being obtained when an oxygen partial pressure of at least 20 p.s.i.g. is maintained in the autoclave or other reactor utilized during the leaching operation. A preferred practice contemplates the use of an oxygen partial pressure within the range from about 60–120 p.s.i.g.

In order that those skilled in the art may more completely understand the present invention and the preferred methods by which the same may be carried into effect, the following specific examples are offered:

Example I

Raw anode slimes having the following analysis wherein the quantities expressed are in terms of per cent by weight:

| | | | |
|---|---|---|---|
| Tellurium | 1.0 | Bismuth | 0.3 |
| Gold | 0.5 | Nickel | 0.8 |
| Silicon | 0.9 | Aluminum | 1.3 |
| Antimony | 1.0 | Copper | 11.0 |
| Iron | 0.15 | Silver | 23.0 |
| Arsenic | 0.5 | Zinc | 0.4 |
| Magnesium | 0.006 | Titanium | 0.006 |
| Lead | 28.0 | Calcium | 0.007 |
| Tin | 9.0 | | | are washed with water to remove 15% of the solids. There results a product containing 6.83% selenium and 1.24±0.05% tellurium.

Into a one-liter stainless steel autoclave are introduced 120 gms. of thus-washed slimes along with 400 ml. of a 20% by weight sodium hydroxide solution. The resulting slurry in caustic solution is agitated and heated to 197° C., air being introduced to give a total pressure of 500 p.s.i.g. in the autoclave. After 30 minutes leaching, the pressure has dropped to 450 p.s.i.g. The autoclave is then vented under pressure to replace the oxygen consumed and fresh air is introduced to regain the pressure of 500 p.s.i.g. The system is vented in this manner at frequent intervals during the total leaching time of 22 hours, the temperature varying between 194 and 203° C.

After cooling, the leach liquor is separated from the residue by filtration and the residue washed with water. The filtrate amounts to 562 ml. and the wash water 342 ml., the washed residue weighing 62.5 gms. after drying. Chemical analysis [1] indicates that the filtrate and wash solution contain 97.5% of the selenium originally present in the slime. Analysis of the filtrate for tellurium indicates the presence of less than 0.1 mg. per ml.

Example II

Into a one-liter capacity stainless steel autoclave are introduced 10 gms. of unwashed copper refinery anode slimes and 97 ml. of a 40% by weight solution of sodium hydroxide. This mixture is heated to 250° C. for 72 hours with continuous agitation. An oxygen atmosphere is maintained in the autoclave, the oxygen partial pressure being about 200 p.s.i. After cooling and opening the autoclave, the reaction products are diluted with 100 ml. of water, agitated for one hour at a temperature of 90° C. and filtered. The washed and dried residue weighs 3.33 gms. The filtrate and washings are then diluted to 250 ml. Analysis indicates that 98% of the selenium originally present in the slimes has thus been extracted. The amount of tellurium in the filtrate is too small to be determined by conventional analytical methods.

Example III

Into a one-liter capacity stainless steel autoclave are introduced 120 gms. of water washed slimes and 400 ml. of a 10% by weight sodium hydroxide solution. The thus-prepared slurry is heated to 197° C. with continuous agitation and air is introduced to provided a total pressure of 500 p.s.i.g. After 25 minutes, the pressure has decreased to 440 p.s.i.g. The autoclave is then flushed with air to replace the oxygen and air repressurized to 500 p.s.i.g. The system is thus vented at intervals so that a partial pressure of oxygen is always maintained over the solution. After leaching for 24 hours, the charge is cooled and the leach solution is separated by filtration. The residue is washed and dried and weighs 85.7 gms. The volume of the filtrate is 316 ml. and that of the wash water 188 ml. Chemical analysis indicates that better than 95% of the selenium is extracted from the slimes. The amount of tellurium in the filtrate is less than 0.1 mg. per ml.

Example IV

A one-liter capacity stainless steel autoclave is charged with 120 gms. of water-washed slimes and 400 ml. of 10% by weight sodium hydroxide solution. The sealed autoclave is heated to a temperature of 190–200° C. for a period of 24 hours. During this time, the pressure reaches a maximum of 193 p.s.i.g. The only oxygen available to the leaching solution in this experiment is that contained in the air originally sealed into the autoclave. No air is added during the entire leaching period. The charge is then cooled and the leach solution separated by filtration. The volume of the filtrate is 340 ml. and that of the wash water is 79 ml. The dried residue weighs 90.4 gms. Only 1.7% of the selenium, but 23.8% of the tellurium originally present in the slimes are found in the filtrate. These results differ significantly from those obtained using an oxygen containing atmosphere maintained over the leaching solution at elevated temperature and pressure in accordance with this invention.

Example V

A slurry of 40 gms. of copper refinery anode slimes and 200 ml. of a 20% by weight, sodium hydroxide solution are agitated in an open beaker and held at a temperature of 90–100° C. for a period of 6 hours. The leaching solution is separated from the residue by filtration. The filtrate thus obtained contains 8.6% of the selenium and 6.2% of the tellurium originally present in the slimes.

These results indicate that the results characterizing the practice of the present invention are not obtained using atmospheric pressure and temperatures below the normal boiling points of the leaching solution.

The foregoing examples clearly illustrate the ability of the method of the present invention selectively to extract selenium from source materials, such as anode slimes, containing both selenium and tellurium, without extracting tellurium and precious metals. The recovery of substantially pure selenium from the filtrate obtained in accordance with this invention may advantageously be made in accordance with the invention described and claimed in my above-mentioned co-pending application Serial No. 527,287 filed August 9, 1955. Alternatively, if desired, elemental selenium may be precipitated by acidifying the filtrate, e.g., with sulfuric or hydrochloric acid, and introducing sulfur dioxide after the addition of a

---

[1] Via Scott's Standard Methods of Analysis, fifth edition, volume I, page 789, "Selenium and Tellurium in Electrolytic Copper Slimes."

chloride to aid complete precipitation as in conventional selenium recovery processes.

Elemental tellurium may be recovered from the residue in accordance with methods found in the prior art as by charging to a Dore furnace wherein the tellurium goes into an alkaline slag from which it may be recovered by leaching. Should the copper content of the residue be too high for charging to a Dore furnace, it may be diminished by aeration of the residue in dilute sulfuric acid. Hence, it will be appreciated that the method of the present invention is utilizable with present practice for other metallurgical operations and may be incorporated into existing overall metallurigical processes for the treatment of anode slimes and/or other source materials without disrupting many of the steps already in use.

While copper refinery anode slimes have been indicated as a prime source material for selenium and tellurium, other sources also may be employed. Selenium and tellurium are present in copper anode slimes as selenides or tellurides of the heavy metals, such as copper, silver, and gold. The results, according to the practice of the present invention indicate that the selenides are less stable than the tellurides under the conditions employed. Where selenium and tellurium are present together but heavy metals are absent, it is possible to add heavy metals and form selenides and tellurides prior to carrying out the practice of this invention. Accordingly, it will be appreciated that sources of selenium and tellurium other than copper anode slimes may be considered for use in the method of this invention including such materials as sulfuric acid plant flue dust, vegetation containing selenium and tellurium, lead chamber sludge from sulfuric acid plants, and the like.

It is to be understood that although the invention has been described with specific reference to particular embodiments thereof, it is not to be so limited, since changes and alterations therein may be made which are within the full intended scope of this invention as defined by the appended claims.

What is claimed is:

1. A process of separately recovering selenium values and tellurium values from a starting material containing both selenium values and tellurium values in substantial amounts, comprising the steps of subjecting said starting material to a treatment with an aqueous solution of an alkali metal hydroxide in an atmosphere consisting of oxygen at an oxygen partial pressure of the order of 200 p.s.i. and at a temperature within the range of about 150°–400° C., carrying on said treatment as aforesaid for a period of time sufficient to convert the selenium values present in the starting material to a water-soluble form and to convert the tellurium values present to a substantially water-insoluble form, adding oxygen during this period as is required to always maintain said oxygen partial pressure, separating the solution from the remaining solid material following the treatment aforesaid and thereby obtaining a solution containing substantially all the selenium values originally present and a solid residue containing substantially all the tellurium values originally present.

2. The method as claimed in claim 1 wherein the alkali metal hydroxide is present in an amount within the range of from about 5–50% by weight.

3. The method as claimed in claim 1 wherein the reaction is carried out at a temperature of the order of 250° C.

4. The method as claimed in claim 1 wherein the reaction is carried out for a period of at least 5 hours.

5. The method as claimed in claim 4 wherein the reaction is carried out for about 10 to 72 hours.

References Cited in the file of this patent

UNITED STATES PATENTS

| | | |
|---|---|---|
| 2,048,563 | Poland | July 21, 1936 |
| 2,084,394 | Heberlein | June 22, 1937 |
| 2,835,558 | Vaaler | May 20, 1958 |

OTHER REFERENCES

Schloen et al.: in "Journal of Metals," vol. 188, May 1950, pp. 764–777.

UNITED STATES PATENT OFFICE
CERTIFICATE OF CORRECTION

Patent No. 2,990,248                                June 27, 1961

Luther A. Vaaler

It is hereby certified that error appears in the above numbered patent requiring correction and that the said Letters Patent should read as corrected below.

Column 3, in the table of Example 1, left-hand column, before line 1 thereof, insert -- Selenium ------6.83 --; same table, line 1, for "Tellurium -------- 1.0" read -- Tellurium -------1.29 --.

Signed and sealed this 28th day of November 1961.

(SEAL)
Attest:

ERNEST W. SWIDER
Attesting Officer

DAVID L. LADD
Commissioner of Patents

USCOMM-DC